US011422622B2

(12) United States Patent
Jeong et al.

(10) Patent No.: US 11,422,622 B2
(45) Date of Patent: Aug. 23, 2022

(54) ELECTRONIC DEVICE AND OPERATING METHOD THEREOF

(71) Applicant: SAMSUNG ELECTRONICS CO., LTD., Suwon-si (KR)

(72) Inventors: Youngmo Jeong, Suwon-si (KR); Bonkon Koo, Suwon-si (KR); Sunghwan Shin, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/334,130

(22) Filed: May 28, 2021

(65) Prior Publication Data

US 2021/0373658 A1 Dec. 2, 2021

Related U.S. Application Data

(60) Provisional application No. 63/031,125, filed on May 28, 2020.

(30) Foreign Application Priority Data

Oct. 27, 2020 (KR) .................. 10-2020-0140700

(51) Int. Cl.
*G09G 5/00* (2006.01)
*G06F 3/01* (2006.01)
(Continued)

(52) U.S. Cl.
CPC .............. *G06F 3/013* (2013.01); *G06T 3/40* (2013.01); *G06T 7/73* (2017.01); *H04L 67/38* (2013.01); *G06T 2200/16* (2013.01)

(58) Field of Classification Search
CPC ..... G02B 27/0172; G06F 3/011; G06F 3/013; H04L 67/38; G06T 2200/16; G06T 3/40; G06T 3/4069; G06T 7/73
See application file for complete search history.

(56) References Cited

U.S. PATENT DOCUMENTS 10,115,205 B2 10/2018 Cavin et al.
10,330,935 B2 6/2019 Shpunt
(Continued)

FOREIGN PATENT DOCUMENTS

| JP | 10-20183 A | 1/1998 |
| KR | 10-2010-0062012 A | 6/2010 |
| WO | 2018/211673 A1 | 11/2018 |

OTHER PUBLICATIONS

Meng, Xiaoxu et al., "Eye-dominance-guided Foveated Rendering", IEEE Transactions on Msualization and Computer Graphics, vol. 26, No. 5, May 2020, pp. 1972-1980.

(Continued)

*Primary Examiner* — Insa Sadio
(74) *Attorney, Agent, or Firm* — Sughrue Mion, PLLC

(57) ABSTRACT

An electronic device that outputs at least one calibration point through a display, obtains gaze information corresponding to the at least one calibration point by using a gaze tracking sensor in response to an output of guide information instructing a user wearing the electronic device to gaze at the at least one calibration point, obtains a gaze accuracy corresponding to the at least one calibration point based on the obtained gaze information, determines a gaze zone-specific resolution based on the gaze accuracy corresponding to the at least one calibration point, and outputs an image through the display based on the determined gaze zone-specific resolution.

19 Claims, 12 Drawing Sheets

(51) Int. Cl.
    *G06T 3/40*           (2006.01)
    *H04L 67/131*       (2022.01)
    *G06T 7/73*           (2017.01)

(56) References Cited

U.S. PATENT DOCUMENTS

| | | |
|---|---|---|
| 10,438,318 B2 | 10/2019 | Pohl |
| 10,546,364 B2 | 1/2020 | Bastani et al. |
| 2016/0085301 A1 | 3/2016 | Lopez |
| 2017/0340205 A1* | 11/2017 | Liu ................ A61B 3/113 |
| 2018/0348861 A1* | 12/2018 | Uscinski ............ G06F 1/163 |
| 2019/0130297 A1 | 5/2019 | Linden |
| 2019/0204913 A1 | 7/2019 | Sarkar et al. |
| 2019/0346919 A1 | 11/2019 | Klingstrom |
| 2019/0384381 A1 | 12/2019 | Stafford et al. |
| 2020/0120322 A1 | 4/2020 | Ogasawara |

OTHER PUBLICATIONS

Gwon, et al., "Estimation of Gaze Detection Accuracy Using the Calibration Information-Based Fuzzy System", 2016, Sensors, vol. 16, 24 pages total.

Thibeault, et al., "Improved Accuracy Test Method for Mobile Eye Tracking in Usability Scenarios", 2019, Proceedings of the Human Factors and Ergonomics Society 2019 Annual Meeting, 6 pages total.

Search Report (PCT/ISA/210) & Written Opinion (PCT/ISA/237) dated Sep. 7, 2021 by the International Searching Authority in International Application No. PCT/KR2021/006546.

* cited by examiner

FIG. 8

ELECTRONIC DEVICE AND OPERATING METHOD THEREOF

CROSS-REFERENCE TO RELATED APPLICATIONS

This application is based on and claims the benefit of U.S. Provisional Patent Application No. 63/031,125, filed on May 28, 2020, in the United States Patent and Trademark Office, and claims priority under 35 U.S.C. § 119 to Korean Patent Application No. 10-2020-0140700, filed on Oct. 27, 2020, in the Korean Intellectual Property Office, the disclosures of which are incorporated herein by reference in their entirety.

BACKGROUND

1. Field

Various embodiments of the disclosure relate to an electronic device for displaying an image with a resolution that is set differently according to each of gaze zones, and an operating method of the electronic device.

2. Description of the Related Art

Augmented reality (AR) is a technique that projects a virtual image onto a physical environment space or a real-world object to show an image. An AR device is worn on a face part or a head part of a user to enable the user to see a real scene and a virtual image together through a see-through-type display module arranged in front of eyes of the user.

The image is shown to the user wearing the AR device. However, research is required for a method of providing the image at high speed with a small amount of computations, simultaneously with providing a clear image to the user.

SUMMARY

Provided are an electronic device for displaying an image based on a resolution that is set differently according to each of gaze zones, and an operating method of the electronic device.

Also, provided are an electronic device for setting a resolution differently for each gaze zone by calibrating a gaze tracking sensor, and an operating method of the electronic device.

Technical problems to be solved are not limited to the technical problems described above, and other technical problems may exist.

Additional aspects will be set forth in part in the description which follows and, in part, will be apparent from the description, or may be learned by practice of the presented embodiments of the disclosure.

According to an exemplary embodiment of the disclosure, an electronic device may include a display, a gaze tracking sensor configured to obtain gaze information of an eye of a user, a memory storing one or more instructions, and a processor configured to execute the one or more instructions stored in the memory, wherein the processor is further configured to, by executing the one or more instructions, output at least one calibration point through the display, obtain gaze information corresponding to the at least one calibration point by using the gaze tracking sensor in response to an output of guide information instructing the user wearing the electronic device to gaze at the at least one calibration point, obtain a gaze accuracy corresponding to the at least one calibration point, based on the obtained gaze information, determine a gaze zone-specific resolution based on the gaze accuracy corresponding to the at least one calibration point, and output an image through the display, based on the determined gaze zone-specific resolution.

According to another exemplary embodiment of the disclosure, an operating method of an electronic device may include outputting at least one calibration point through a display, obtaining gaze information corresponding to the at least one calibration point through a gaze tracking sensor in response to an output of guide information instructing a user wearing the electronic device to gaze at the at least one calibration point, obtaining a gaze accuracy corresponding to the at least one calibration point, based on the obtained gaze information, determining a gaze zone-specific resolution based on the gaze accuracy corresponding to the at least one calibration point, and outputting an image through the display, based on the determined gaze zone-specific resolution.

According to another exemplary embodiment of the disclosure, a non-transitory computer-readable recording medium may have recorded thereon a program for executing the operating method on a computer.

According to yet another operating method of an electronic device, an operating method of the electronic device may include displaying at least one calibration point to a user wearing the electronic device to cause the user to look at the at least one calibration point; obtaining line sight line information of the user wearing the electronic device, the line of sight information comprising a plurality of line of sight points collected while the user looks at the at least one calibration point; transmitting the line of sight information to an external server; receiving a line of sight zone-specific resolution from the external server determined using a line of sight accuracy calculated by the external server based on a difference between the at least one calibration point and the plurality of line of sight points; and displaying an image based on a determined line of sight zone-specific resolution. The displayed image may include a central portion and a peripheral portion, the peripheral portion being a part of the image not including the central portion. Additionally, the central portion may indicate a portion of the image having a high line of sight accuracy calculated by the external server. The central portion of the image may be displayed at a first resolution and the peripheral portion of the image may be displayed at a second resolution lower than the first resolution. Finally, the image displayed to the user wearing the electronic device may be perceived by the user as a high-resolution image at high speed even though the displayed image requires reduced computations, data, and power for rendering when compared to displaying the entire image at the first resolution.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 8 is a view for describing an example of a gaze accuracy map according to an exemplary embodiment of the disclosure;

DETAILED DESCRIPTION

Figure 1:
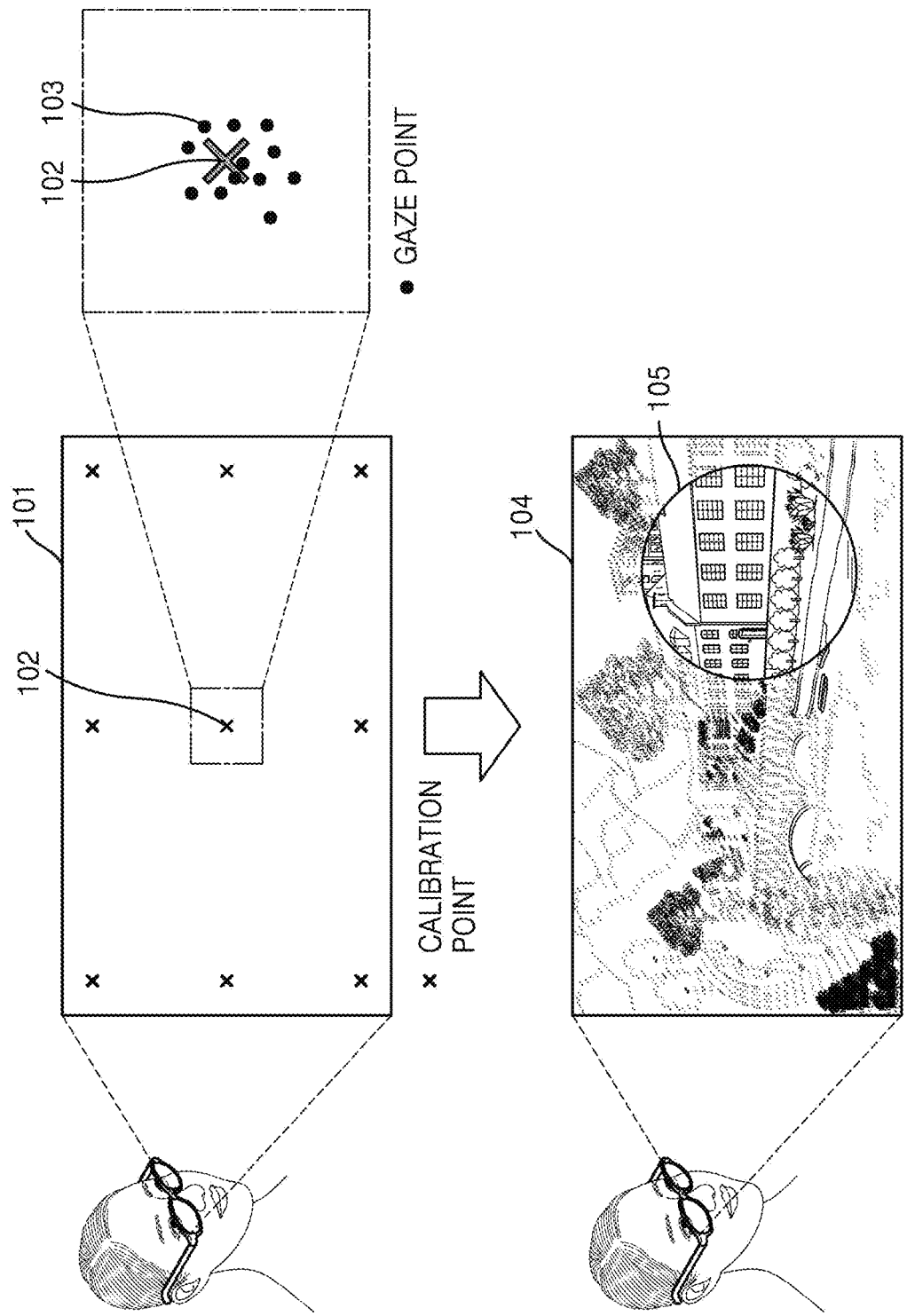
FIG. 1 is a diagram for depicting an exemplary embodiment of the disclosure.

Hereinafter, embodiments of the disclosure will be described in detail with reference to the attached drawings to allow those of ordinary skill in the art to easily carry out the embodiments of the disclosure. However, the disclosure may be implemented in various forms, and are not limited to the embodiments of the disclosure described herein. To clearly describe the disclosure, parts that are not associated with the description have been omitted from the drawings, and throughout the specification, identical reference numerals refer to identical parts.

Although terms used in the disclosure are selected with general terms popularly used at present under the consideration of functions in the disclosure, the terms may vary according to the intention of those of ordinary skill in the art, judicial precedents, or introduction of new technology. Thus, the terms used in the disclosure should be defined not by the simple names of the terms but by the meaning of the terms and the contents throughout the disclosure.

Terms such as first, second, and the like may be used to describe various elements, but the elements should not be limited to those terms. These terms may be used for the purpose of distinguishing one element from another element.

Throughout the disclosure, the expression "at least one of a, b or c" indicates only a, only b, only c, both a and b, both a and c, both b and c, all of a, b, and c, or variations thereof.

The terms used in the disclosure are for the purpose of describing particular exemplary embodiments only and are not intended to limit the disclosure. The singular forms are intended to include the plural forms as well, unless the context clearly indicates otherwise. Throughput the specification, when a part is connected to another part, the part is not only directly connected to another part but also electrically connected to another part with another device intervening in them. If it is assumed that a certain part includes a certain component, the term 'including' means that a corresponding component may further include other components unless a specific meaning opposed to the corresponding component is written.

In the present specification, especially, in the claims, the use of "the" and other demonstratives similar thereto may correspond to both a singular form and a plural form. Unless the order of operations of a method according to the disclosure is explicitly mentioned or described otherwise, the operations may be performed in a proper order. The disclosure is not limited by the order the operations are mentioned.

The phrase used in various parts of the present specification, such as "in some embodiments of the disclosure" or "in an embodiment of the disclosure" does not necessarily indicate the same embodiment of the disclosure.

Some embodiments of the disclosure may be represented by functional block components and various processing operations. All or some of such functional blocks may be implemented by various numbers of hardware and/or software components which perform specific functions. For example, functional blocks of the disclosure may be implemented by one or more microprocessors or circuit elements for a specific function. In addition, the functional blocks of the disclosure may also be implemented as various programming or scripting languages. The functional blocks may be implemented as an algorithm executed in one or more processors. Furthermore, the disclosure may employ any number of conventional techniques for electronics configuration, signal processing and/or control, data processing and the like. The term "mechanism", "element", "means", or "component" is used broadly and is not limited to mechanical or physical components.

Connecting lines or connecting members between elements shown in the drawings are intended to merely illustrate functional connections and/or physical or circuit connections. In an actual device, connections between elements may be indicated by replaceable or added various functional connections, physical connections, or circuit connections.

In the disclosure, "augmented reality (AR)" refers to showing a virtual image in a physical environment space of the real world or showing a real object together with a virtual image.

An "AR device" refers to a device capable of expressing "AR", and may generally include not only AR glasses worn on a face part of a user, but also a head-mounted display (HMD) apparatus or an AR helmet, etc., worn on a head part of the user.

Meanwhile, a "real scene" refers to a scene of the real world the user sees through the AR device, and may include a real-world object. The "virtual image" may include both a static image and a dynamic image which are images generated through an optical engine. The virtual image may be an image which is observed together with the real scene and indicates information regarding the real object in the real scene or information or a control menu, etc., regarding an operation of the AR device.

Thus, a general AR device includes an optical engine that generates a virtual image including light generated by a light source and a waveguide that guides the virtual image generated by the optical engine to user's eyes and is formed of a transparent material to allow the user to see the scene of the real world. As described above, the AR device requires an optical element for changing a path of the light that is inherently linear to guide the light generated by the optical engine because of needing to allow observation of the scene of the real world together. In this case, the path of the light may be changed using reflection with a mirror, etc., and the path of the light may be changed through diffraction with a diffractive element such as a diffractive optical element (DOE), a holographic optical element (HOE), etc., without being limited thereto.

Hereinafter, the disclosure will be described with reference to the accompanying drawings.

FIG. 1 is a diagram for depicting an exemplary embodiment of the disclosure.

An electronic device 100 (see FIG. 2) according to an exemplary embodiment of the disclosure may be an AR device. In addition, the electronic device 100 according to an exemplary embodiment of the disclosure may be a virtual reality (VR) device.

For example, as shown in FIG. 1, the electronic device 100 may be a device implemented in the form of glasses wearable on the face part of the user. The electronic device 100 may be a device implemented in the form of goggles, a helmet, a hat, etc., wearable on the head part of the user, without being limited thereto.

As shown in FIG. 1, when the user wears the electronic device 100 in the form of glasses wearable on the face part of the user, a gaze tracking calibration process may be performed.

Figure 2:
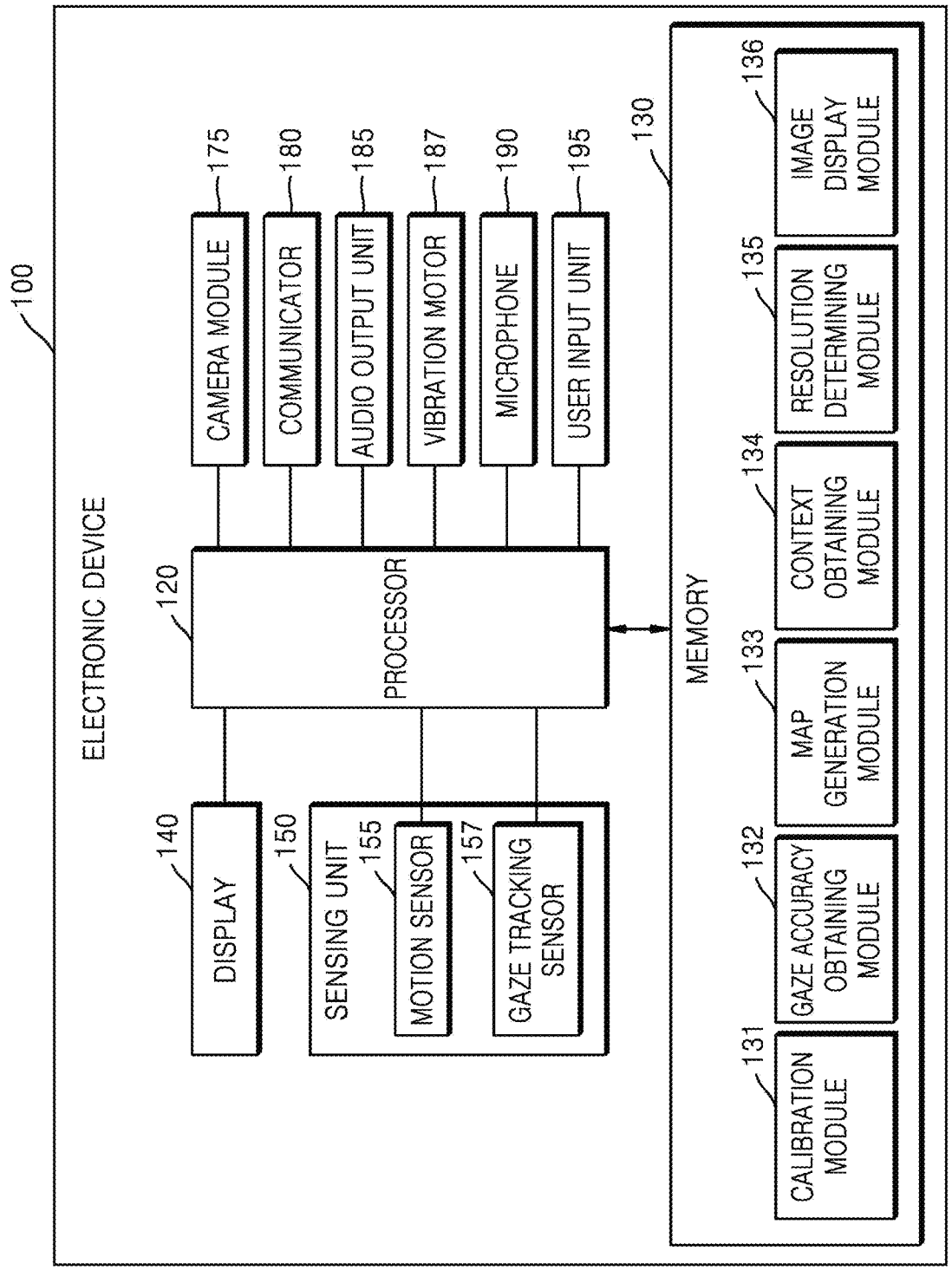
FIG. 2 is a block diagram of an electronic device according to an exemplary embodiment of the disclosure.

When the user initially uses the electronic device 100, calibration of a gaze tracking sensor 157 of FIG. 2 may be required to accurately measure the gaze of the left and right eyes of the user.

The electronic device 100 may output a virtual image 101 where a plurality of calibration points (e.g., nine points) for leading the gaze of the user are provided to lead the user to gaze each of the plurality of calibration points. When the user gazes each calibration point included in the virtual image 101, the electronic device 100 may store gaze information, output through the gaze tracking sensor 157 of FIG. 2, in a memory 130 in the form of a table.

The gaze information according to an exemplary embodiment of the disclosure, which is information obtained by the gaze tracking sensor 157 of FIG. 2 of the electronic device 100, may include at least one of a gaze direction in which the eye of the user is directed, a pupil position of the eye of the user, or coordinates of the central point of the pupil.

The electronic device 100 may provide an AR service by using the obtained gaze information in gaze tracking calibration. The electronic device 100 may obtain the position or coordinates (two-dimensional (2D) coordinates (x, y)) of the gaze of the user, by comparing previously stored gaze information obtained in gaze tracking calibration with the gaze information obtained from the gaze tracking sensor 157. The electronic device 100 may provide various AR services by outputting the virtual image based on the position or coordinates (2D coordinates (x, y)) of the gaze.

According to an exemplary embodiment of the disclosure, the electronic device 100 may obtain a gaze accuracy corresponding to each calibration point based on the gaze information obtained in gaze tracking calibration.

According to an exemplary embodiment of the disclosure, the gaze accuracy may be a value that digitizes sight according to a criterion when the user gazes each calibration point indicated at a different position. The gaze accuracy may be calculated based on a distance between a particular calibration point and a gaze point indicating a position of the gaze when the user gazes the particular calibration point.

Referring to FIG. 1, for example, the gaze accuracy may be calculated based on a distance between a particular calibration point 102 included in the virtual image 101 and a gaze point 103 indicating a position of a gaze when the user gazes the particular calibration point 102. According to an operating speed of the gaze tracking sensor 157 of FIG. 2, a plurality of gaze points 103 may be obtained for one second.

Meanwhile, in terms of an eyeball structure of a human, the eye of the human may recognize an image formed on the fovea of the retina most clearly, and as a distribution rate of visual cells decreases toward the periphery except for the fovea, peripheral vision may be degraded.

As a result, when the user gazes at a real scene or a specific image, a visual cognitive ability for an image formed on the periphery except for the fovea may be degraded. That is, the user may recognize a definition difference of an image formed on the fovea, but the sensitivity to the definition difference of the image formed on the periphery may be relatively low. Thus, even when the electronic device 100 processes an image to be formed on the periphery except for the fovea of the eye of the user such that the image has a low definition, the user may recognize the processed image as having a definition that is similar to that of the image formed on the fovea. Foveated rendering is a technique which renders a region to which a gaze is directed, which is a region to be formed on the fovea of the eye of the user, to a high resolution and renders a peripheral region to a low resolution, when an image is displayed.

According to an exemplary embodiment of the disclosure, the electronic device 100 may measure a gaze accuracy in the region to which the user's gaze is directed, by using a process of performing calibration, and may render a gaze zone having a low gaze accuracy in the region to which the user's gaze is directed to a low resolution when the image is displayed on a display 140 of FIG. 2.

When the electronic device 100 displays the image in the gaze zone having the low gaze accuracy, the electronic device 100 may display the image having a low resolution by using a smaller amount of data and less computations than when displaying the image in the gaze zone having the high gaze accuracy, thereby reducing a rendering load while providing the image to allow the user to recognize as if the user sees an image having a globally high resolution.

Referring to FIG. 1, the electronic device 100 may determine a central region 105 having a high gaze accuracy in the entire display region 104 to be displayed on the display 140 of FIG. 2, based on a gaze accuracy corresponding to each calibration point obtained through eye tracking calibration. The electronic device 100 may provide an image having a cognitively high resolution while reducing a resource required for rendering by processing a resolution of an image to be displayed on the peripheral region except for the central region 105 to a lower resolution than that of an image to be displayed in the central region 105.

A description will be made with reference to the attached drawings of a detailed method, performed by the electronic device 100, of obtaining a gaze accuracy, determining a gaze zone-specific resolution, and displaying an image according to an embodiment of the disclosure.

FIG. 2 is a block diagram of an electronic device according to an exemplary embodiment of the disclosure.

According to an exemplary embodiment of the disclosure, the electronic device 100 may be, but is not limited to, an AR device that has a communication function and a data processing function and provides an AR image.

Referring to FIG. 2, the electronic device 100 according to an embodiment of the disclosure may include a memory 130, a processor 120, a display 140, a sensing unit 150, a camera module 175, a communicator 180, an audio output unit 185, a vibration motor 187, a microphone 190, and a user input unit 195. However, all of the components shown in FIG. 2 are not essential components of the electronic device 100. More or less elements than those shown in FIG. 2 may be used to implement the electronic device 100.

The processor 120 of the electronic device 100 may control the display 140, the sensing unit 150, the camera module 175, the communicator 180, the audio output unit 185, the vibration motor 187, the microphone 190, the user input unit 195, etc., by executing programs stored in the memory 130.

The memory 130 according to an embodiment of the disclosure may store programs to be executed by the processor 120 and may store data input to or output from the electronic device 100.

The memory 130 may include a storage medium of at least one of a flash memory, a hard disk, a multimedia card, a card-type memory (e.g., a secure digital (SD), extreme digital (XD) memory, etc.), random-access memory (RAM), static random-access memory (SRAM), read-only memory (ROM), electrically erasable programmable read-only memory (EEPROM), programmable read-only memory (PROM), a magnetic memory, a magnetic disk, or an optical disk.

Programs stored in the memory 130 may be classified depending on functions thereof into a plurality of software modules, e.g., but is not limited to, a calibration module 131, a gaze accuracy obtaining module 132, a map generation module 133, a context obtaining module 134, a resolution determining module 135, and an image display module 136, and may store some of them or further include another software module.

The processor 120 may generally control all operations of the electronic device 100. The processor 120 may control an operation or a function to be performed by the electronic device 100, by executing instructions or programs stored in the memory 130.

According to an embodiment of the disclosure, the processor 120 may include one processor or a plurality of processors. The processor 120 may include at least one hardware component among a central processing unit (CPU), a microprocessor, a graphics processing unit (GPU), application specific integrated circuits (ASICs), digital signal processors (DSPs), digital signal processing devices (DSPDs), programmable logic devices (PLDs), or field programmable gate arrays (FPGAs), without being limited thereto.

The processor 120 may calibrate the gaze tracking sensor 157 of FIG. 2 by executing the calibration module 131 stored in the memory 130.

The processor 120 may previously calibrate the gaze tracking sensor 157 to accurately measure the left eye and the right eye of the user when the processor 120 performs an operation requiring tracking of a user's gaze.

According to an exemplary embodiment of the disclosure, when the processor 120 determines that the particular user is initially wearing the electronic device 100 based on identification information of a particular user, the processor 120 may perform calibration. The processor 120 may also perform calibration upon reception of a preset user input. The processor 120 may also perform calibration based on a preset period, without being limited thereto.

According to an embodiment of the disclosure, the processor 120 may output at least one calibration point through the display 140.

According to an embodiment of the disclosure, the shape, number, arrangement position, color, etc., of calibration points may vary. For example, the shape of the calibration point may be, but is not limited to, a circular shape, an X shape, etc. The plurality of calibration points may be indicated at regular arrangement intervals or may be indicated at random at irregular arrangement intervals. The calibration point may be indicated as a fixed point, a moving point, or a particular pattern (e.g., a stripe), without being limited thereto.

According to an embodiment of the disclosure, the processor 120 may output guide information instructing the user wearing the electronic device 100 to gaze at at least one calibration point. For example, the processor 120 may output guide information like "Look at the white point." through the audio output unit 185.

According to an exemplary embodiment of the disclosure, the processor 120 may obtain gaze information corresponding to the at least one calibration point through the gaze tracking sensor 157 as the processor 120 outputs the guide information. The processor 120 may store the gaze information obtained in response to an output of the guide information instructing the user to gaze a particular calibration point, as the gaze information corresponding to the particular calibration point.

According to an exemplary embodiment of the disclosure, the processor 120 may obtain left-eye gaze information and right-eye gaze information of the user through the gaze tracking sensor 157 in the process of performing calibration. Thus, the processor 120 may store the left-eye gaze information and the right-eye gaze information in the memory 130.

The processor 120 may obtain a gaze accuracy corresponding to at least one calibration point based on the gaze information obtained by the calibration module 131 by executing the gaze accuracy obtaining module 132 stored in the memory 130.

The processor 120 may determine at least one gaze point corresponding to at least one calibration point based on the obtained gaze information. According to an embodiment of the disclosure, the gaze point may be a point indicating a position of a gaze when the user looks at a particular calibration point.

The processor 120 may obtain the plurality of gaze points 103 according to an operating speed of the gaze tracking sensor 157 of FIG. 2. For example, the processor 120 may obtain 60 gaze points in one second when the gaze tracking sensor 157 operates at 60 Hz.

The processor 120 may calculate a gaze accuracy at a particular calibration point by using a gaze point corresponding to the particular calibration point.

According to an exemplary embodiment of the disclosure, the gaze accuracy may be a value that digitizes sight according to a criterion when the user gazes at the particular calibration point. The processor 120 may calculate the gaze accuracy corresponding to the particular calibration point by using a distance between the gaze point indicating the position of the gaze when the user gazes at the particular calibration point and the particular calibration point.

The processor 120 may obtain a gaze accuracy for each of the eyes of the user. The processor 120 may obtain the gaze accuracy for the left eye based on left-eye gaze information previously stored in the memory 130. The processor 120 may obtain the gaze accuracy for the right eye based on right-eye gaze information previously stored in the memory 130.

The processor 120 may generate a gaze accuracy map based on the gaze accuracy value obtained by the gaze accuracy obtaining module 132, by executing the map generation module 133 stored in the memory 130.

According to an embodiment of the disclosure, the gaze accuracy map may indicate a relative difference between gaze zone-specific gaze accuracies. A particular color indicating a particular gaze accuracy may be designated to express the gaze accuracy map. For example, when a bright color is designated for a high gaze accuracy and a dark color is designated for a low gaze accuracy, a region marked in the dark color in the gaze accuracy map may be determined to have a low gaze accuracy.

According to an exemplary embodiment of the disclosure, the processor 130 may perform interpolation that estimates a gaze accuracy in a region where a calibration point is not indicated based on a gaze accuracy at the calibration point in the entire display region displayed on the display 140. The processor 130 may generate a gaze accuracy map based on gaze accuracies at a plurality of calibration points and a gaze accuracy estimated for a region excluding a calibration point. The processor 120 may generate the gaze accuracy map by expressing a relative difference between the gaze zone-specific gaze accuracies with a color distribution using a particular color designated to indicate a particular gaze accuracy.

The processor 120 may generate the gaze accuracy map for each of the eyes of the user. The processor 120 may generate a left-eye gaze accuracy map based on the gaze accuracy of the left eye. The processor 120 may also generate a right-eye gaze accuracy map based on the gaze accuracy of the right eye.

The processor 120 may identify the state of the electronic device 100 or the state of the user using the electronic device 100 by executing the context obtaining module 134 stored in the memory 130.

According to an exemplary embodiment of the disclosure, the processor 120 may identify a type of an application being executed by the electronic device 100. For example, the type of the application may be, but is not limited to, a navigation application, a message application, or a game application.

According to an exemplary embodiment of the disclosure, the processor 120 may identify an action state of the user wearing the electronic device 100. For example, the action state of the user may be, but is not limited to, a stationary state, a walking state, or a vehicle driving state.

According to an exemplary embodiment of the disclosure, the processor 120 may determine based on the identified state of the electronic device 100 or the identified action state of the user using the electronic device 100 whether providing of a high-resolution image is required or high-speed providing of a low-resolution image is required.

The processor 120 may determine a gaze zone-specific resolution based on the gaze accuracy map generated by the map generation module 133 by executing the resolution determining module 135 stored in the memory 130.

The processor 120 may determine a gaze zone-specific resolution based on the gaze accuracy map for the entire display region of the display 140 when the processor 120 displays the image on the display 140.

The processor 120 may determine the central region and the peripheral region in the entire display region of the display 140, based on the gaze accuracy map. According to an embodiment of the disclosure, the processor 120 may determine a gaze zone having a high gaze accuracy as the central region and the other region than the central region of the entire display region of the display 140 as the peripheral region. The processor 120 may determine a resolution of the peripheral region to be lower than that of the central region.

The processor 120 may determine a gaze zone-specific resolution for both eyes of the user. The processor 120 may determine a gaze zone-specific resolution of the left eye based on the gaze accuracy map of the left eye. The processor 120 may determine a gaze zone-specific resolution of the right eye based on the gaze accuracy map of the right eye.

According to an exemplary embodiment of the disclosure, the processor 120 may determine an adjustment level of a gaze zone-specific resolution based on the type of the application being executed by the electronic device 100, identified by the context obtaining module 134.

According to an exemplary embodiment of the disclosure, the adjustment level of the gaze zone-specific resolution may mean a high level or a low level of the gaze zone-specific resolution is required according to the image to be displayed on the display 140.

When image rendering at a high speed rather than at high resolution is required, an adjustment level may be set for the entire display region of the display 140 thereby outputting a low-resolution image in the central region and outputting a lower-resolution image than that in the central region in the peripheral region.

For example, when the navigation application is identified as being executed, providing information rapidly is required rather than providing a high-resolution image such that an adjustment level of a resolution may be set low. Thus, the processor 120 may rapidly provide an image with a small amount of computations by outputting a relatively low-resolution image in the central region.

The processor 120 may determine an adjustment level of a gaze zone-specific resolution based on the action state of the user wearing the electronic device 100.

According to an exemplary embodiment of the disclosure, the action state of the user may include at least one of the stationary state, the walking state, or the vehicle driving state.

For example, when the user's action state is identified as the vehicle driving state, the processor 120 may set the adjustment level of the resolution to be low because the user may have difficulty carefully seeing the image displayed on the display 140 and thus providing the high-resolution image is not required. Thus, the processor 120 may rapidly provide an image through rapid rendering with a small amount of data and a small amount of computations by outputting a relatively low-resolution image in the central region.

The processor 120 may execute the image display module 136 stored in the memory 130 to output the image through the display 140 based on the gaze zone-specific resolution determined by the resolution determining module 135.

According to an embodiment of the disclosure, the processor 120 may output through the display 140, the low-resolution image for the peripheral region except for the central region where a gaze accuracy of the user is high, in the entire display region of the display 140, thereby reducing the amount of data and the amount of computations for rendering and thus power consumption.

According to an exemplary embodiment of the disclosure, when the electronic device 100 receives an image on which foveated rendering is performed through streaming from an external server or an external device (e.g., a smartphone), the processor 120 may rapidly display the streamed image on the display 140 based on a computational amount reduction corresponding to a data amount reduction.

The processor 120 may provide an image that is appropriate for the gaze accuracy for each of the eyes of the user. The processor 120 may display an image that the user may see with the left eye, based on a gaze zone-specific resolution of the left eye, and an image that the user may see with the right eye, based on a gaze zone-specific resolution of the right eye. Thus, the electronic device 100 may provide a cognitively high-resolution image to the user while reducing a rendering load.

The display 140 may output information processed by the processor 120. For example, the display 140 may display a virtual object.

According to an exemplary embodiment of the disclosure, the display 140 may provide an augmented reality (AR) image. The display 140 according to an embodiment of the disclosure may include a waveguide and a display module. The waveguide may include a transparent material in which a partial region of a back surface is shown when the user wears the electronic device 100. The waveguide may include a single-layer or multi-layer flat plate of a transparent material in which light may propagate through internal reflection. The waveguide may receive light of a virtual image projected to face an exit surface of the display module. Herein, the transparent material may refer to a material through which light passes, and a transparency thereof may not be 100% and the transparent material may have a certain color.

In an embodiment of the disclosure, as the waveguide is formed of a transparent material, the user may see not only the virtual object of the virtual image through the display 140, but also an external actual scene, such that the waveguide may be indicated as a see-through display. The display 140 may provide the AR image by outputting the virtual object of the virtual image through the waveguide.

The sensing unit 150 may include the motion sensor 155 and the gaze tracking sensor 157.

The motion sensor 155 may be an inertial measurement unit (IMU). The IMU may be a combination of sensors configured to sense movement of an object in a three-dimensional (3D) space, i.e., changes in position and alignment of the object. For example, the combination of the sensors may include an accelerometer, an angular speed meter, a magnetometer, and a gyroscope.

The motion sensor 155 may include at least one of an acceleration sensor, a magnetic sensor, or a gyroscope sensor.

The gaze tracking sensor 157 may detect gaze information of the eye of the user. According to an embodiment of the disclosure, the gaze information may include at least one of a gaze direction in which the eye of the user is directed, a pupil position of the eye of the user, or coordinates of the central point of the pupil.

The gaze tracking sensor 157 may provide light to the eye (the left eye or the right eye) of the user and detect the amount of light reflected from the eye of the user. The gaze tracking sensor 157 may detect the gaze direction in which the eye of the user is directed, the pupil position of the eye of the user, the coordinates of the central point of the pupil, etc., based on the detected amount of light.

Alternatively, the gaze tracking sensor 157 may provide light to the eye of the user and capture an image of the eye of the user. The gaze tracking sensor 157 may detect the gaze direction in which the eye of the user is directed, the pupil position of the eye of the user, the coordinates of the central point of the pupil, etc., based on the captured image of the eye of the user.

The camera module 175 may capture an image of the periphery of the electronic device 100. The camera 175 may obtain an image frame such as a still image, a moving image, etc., through an image sensor when an application for requiring a photographing function is executed.

The image captured by the image sensor may be processed by the processor 120 or a separate image processor (not shown). The captured image may be displayed on the display 140.

An image frame processed by the processor 120 or a separate image processor (not shown) may be stored in the memory 130 or may be transmitted to the outside through the communicator 180. Two or more camera modules 175 may be included according to a structural aspect of the electronic device 100.

The communicator 180 may include one or more components that enable communication between the electronic device 100 and the external server 200 or an external device (not shown).

For example, the communicator 180 may include a short-range communicator and a mobile communicator.

The short-range communicator may include, but is not limited to, a Bluetooth communication unit, a short-range wireless communication unit (a near field communication (NFC) unit/radio frequency identification (RFID) unit), a wireless local area network (WLAN) (Wireless Fidelity (WiFi)) communication unit, a ZigBee communication unit, an infrared Data Association (IrDA) communication unit, an ultra-wideband (UWB) communication unit, an Ant+ communication unit, etc.

The mobile communicator may transmit and receive a radio signal to and from at least one of a base station, an external terminal, or a server over a mobile communication network. Herein, the radio signal may include various forms of data corresponding to transmission/reception of a voice call signal, a video communication call signal, or a text/multimedia message.

The audio output unit 185 may output audio data received from the communicator 180 or stored in the memory 130. The audio output unit 185 may output an audio signal related to a function (e.g., a call signal receiving sound, a message receiving sound, an alarm sound, etc.) performed by the electronic device 100.

The audio output unit 185 according to an exemplary embodiment of the disclosure may include a speaker, a buzzer, or the like. The audio output unit 185 according to an exemplary embodiment of the disclosure may be implemented in the form of an earphone mounted on or detachably attached to the electronic device 100. The audio output unit 185 according to an embodiment of the disclosure may output sound in a bone-conductive manner.

The vibration motor 187 may output a vibration signal. For example, the vibration motor 187 may output a vibration signal corresponding to output of audio data or video data (e.g., a call signal receiving sound, a message receiving sound, etc.). The vibration motor 187 may output a vibration signal when a user input is received from the user input unit 195. The vibration motor 187 may provide a notification in the form of vibration when the electronic device 100 operates in a vibration mode.

The microphone 190 may receive an external audio signal and process the received audio signal into electric voice data. For example, the microphone 190 may receive an audio signal from an external device or a speaker. The microphone 190 may also receive a voice input of the user to control the electronic device 100. The microphone 190 may use various noise cancellation algorithms for canceling noise generated during reception of the external audio signal.

The user input unit 195 may be a means through which a user inputs data for controlling the electronic device 100. For example, the user input unit 195 may include, but is not limited to, at least one of a keypad, a dome switch, a touch pad (a capacitive overlay type, a resistive overlay type, an infrared beam type, a surface acoustic wave type, an integral strain gauge type, a piezoelectric effect type, etc.), a jog wheel, or a jog switch.

Figure 3:
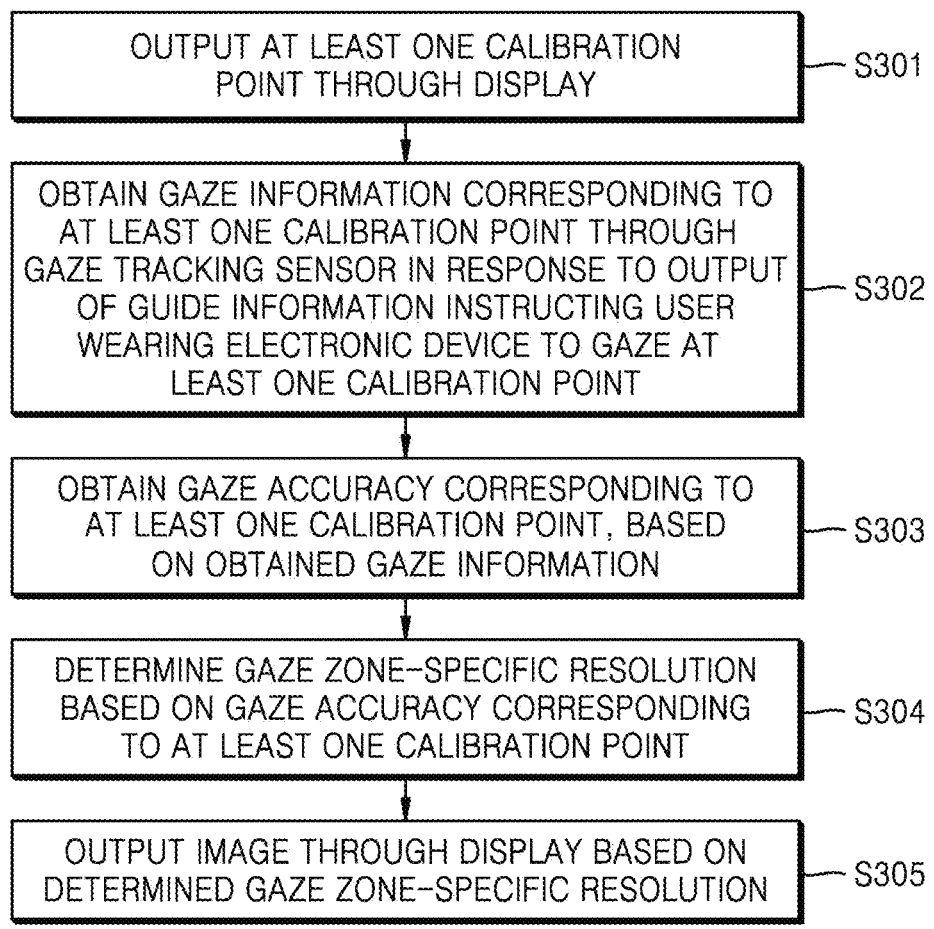
FIG. 3 is a flowchart of an operation of an electronic device according to an exemplary embodiment of the disclosure.

FIG. 3 is a flowchart of an operation of an electronic device according to an exemplary embodiment of the disclosure.

In operation S301 of FIG. 3, the electronic device 100 may output at least one calibration point through the display.

According to an exemplary embodiment of the disclosure, the electronic device 100 may output at least one calibration point through the display 140 of FIG. 2 to perform calibration of the gaze tracking sensor 157 of FIG. 2. When the electronic device 100 determines that the particular user is initially wearing the electronic device 100 based on identification information of a particular user, the electronic device 100 may display a plurality of points on the display 140 of FIG. 2.

For example, the electronic device 100 may display nine X-shape points at regular arrangement intervals on the display 140 of FIG. 2. For example, the electronic device 100 may display even circle-shape points at irregular arrangement intervals on the display 140 of FIG. 2 at random, without being limited thereto.

In operation S302 of FIG. 3, the electronic device 100 may obtain gaze information corresponding to at least one calibration point through the gaze tracking sensor in response to an output of guide information instructing the user wearing the electronic device 100 to gaze at the at least one calibration point.

According to an embodiment of the disclosure, the electronic device 100 may output guide information (e.g., "Loot at the black point.") instructing the user wearing the electronic device 100 to gaze at at least one calibration point through the audio output unit 185 of FIG. 2.

The electronic device 100 may store the gaze information obtained in response to the output of the guide information instructing the user to gaze at a particular calibration point as the gaze information corresponding to the particular calibration point.

In operation S303 of FIG. 3, the electronic device 100 may obtain a gaze accuracy corresponding to at least one calibration point based on the obtained gaze information.

According to an embodiment of the disclosure, the electronic device 100 may determine at least one gaze point corresponding to the at least one calibration point based on gaze information corresponding to the at least one calibration point. According to an exemplary embodiment of the disclosure, the gaze point may be a point indicating a position of a gaze when the user looks at a particular calibration point.

The electronic device 100 may calculate the gaze accuracy corresponding to the particular calibration point by using a distance between the gaze point indicating the position of the gaze when the user gazes at the particular calibration point and the particular calibration point.

According to an exemplary embodiment of the disclosure, when a particular calibration point and a gaze point are close to each other, the gaze accuracy of the user at the particular calibration point may be determined to be high.

In operation S304 of FIG. 3, the electronic device 100 may determine a gaze zone-specific resolution based on the gaze accuracy corresponding to the at least one calibration point.

According to an exemplary embodiment of the disclosure, the electronic device 100 may generate a gaze accuracy map based on the gaze accuracy corresponding to the at least one calibration point and may determine the gaze zone-specific resolution based on the gaze accuracy map. The electronic device 100 may determine a low resolution for a region corresponding to a low gaze accuracy, based on the gaze accuracy map.

The electronic device 100 may determine a gaze zone having a high gaze accuracy as the central region and may determine that the region other than the central region of the entire display region of the display 140 is the peripheral region. The electronic device 100 may determine a resolution of the peripheral region to be lower than that of the central region.

In operation S305 of FIG. 3, the electronic device 100 may output an image through the display, based on the determined gaze zone-specific resolution.

According to an exemplary embodiment of the disclosure, the electronic device 100 may output through the display 140, the low-resolution image for the peripheral region except for the central region where a gaze accuracy of the user is high, in the entire display region of the display 140. Thus, the electronic device 100 may reduce the amount of data and the amount of computations for image rendering and reduce power consumption.

Figure 4:
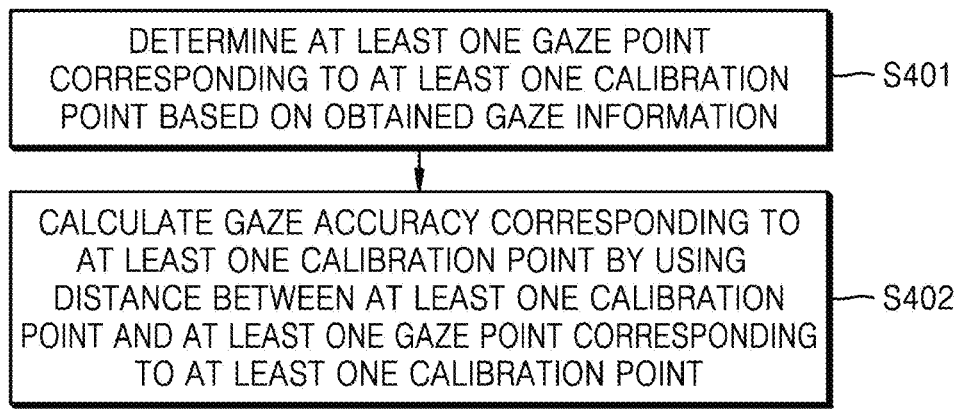
FIG. 4 is a flowchart of a method, performed by an electronic device, of obtaining a gaze accuracy, according to an exemplary embodiment of the disclosure.
Figure 5:
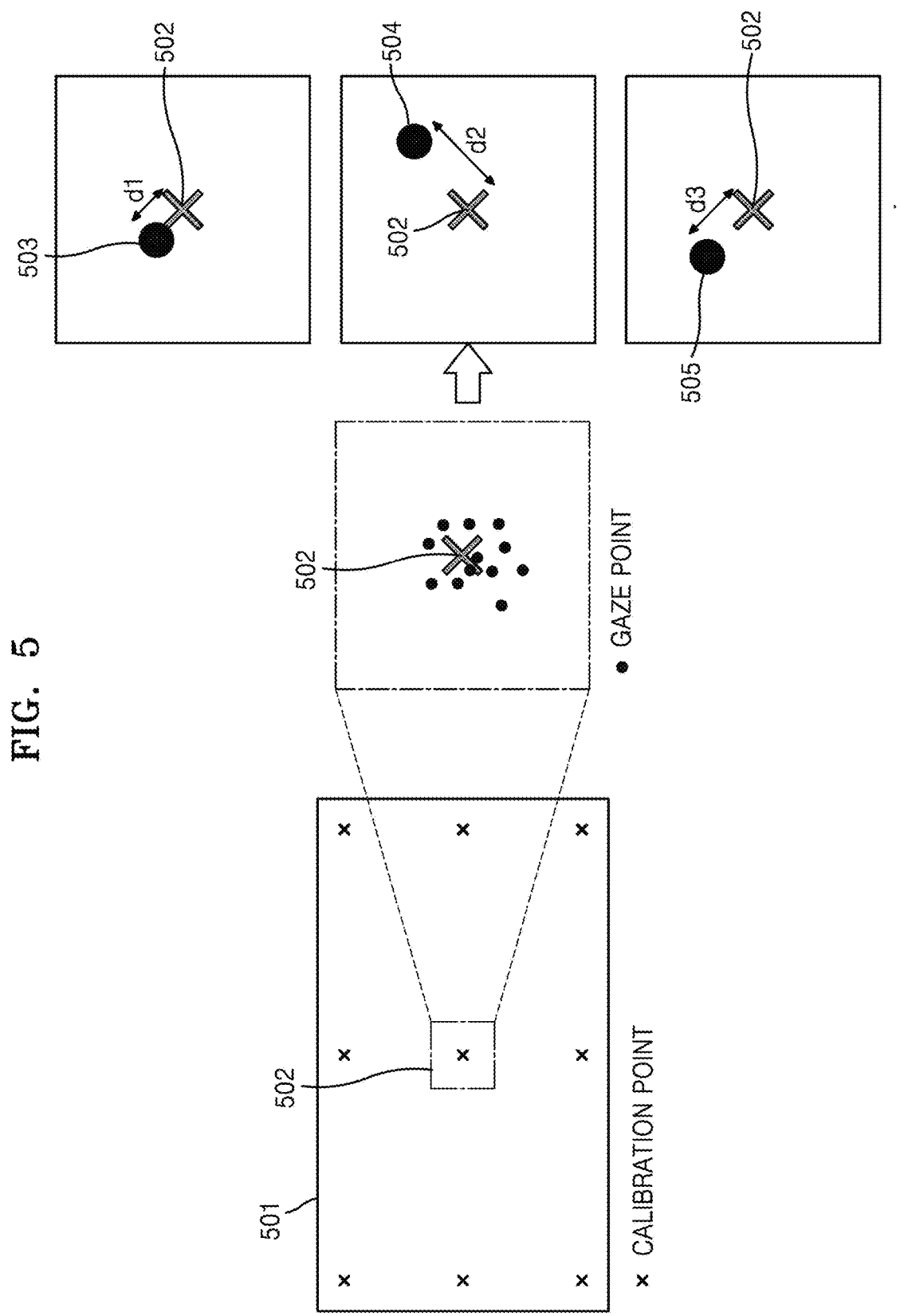
FIG. 5 is a diagram for describing a method, performed by an electronic device, of obtaining a gaze accuracy, according to an exemplary embodiment of the disclosure.

FIG. 4 is a flowchart of a method of a method, performed by an electronic device, of obtaining a gaze accuracy, according to an embodiment of the disclosure. FIG. 5 is a diagram for describing a method, performed by an electronic device, of obtaining a gaze accuracy, according to an exemplary embodiment of the disclosure. FIG. 5 is a view for describing the flowchart of FIG. 4.

In operation S401 of FIG. 4, the electronic device 100 may determine the at least one gaze point corresponding to the at least one calibration point based on the obtained gaze information.

Referring to FIG. 5, the electronic device 100 may output a virtual image 501 on which a plurality of calibration points (e.g., nine points) are indicated to induce the user's gaze through the display 140 of FIG. 2. The electronic device 100 may store gaze information obtained in response to an output of guide information instructing the user to gaze at each of the plurality of calibration points.

The electronic device 100 may store the gaze information obtained in response to the output of the guide information instructing the user to gaze at a particular calibration point 502, as gaze information corresponding to the particular calibration point 502. The electronic device 100 may determine a gaze point corresponding to the particular calibration point 502 based on the gaze information corresponding to the particular calibration point 502.

The electronic device 100 may obtain a plurality of gaze points according to an operating speed of the gaze tracking sensor 157 of FIG. 2. For example, the processor 120 may obtain 200 gaze points by obtaining gaze information 200 times in one second when the gaze tracking sensor 157 operates at 200 Hz.

Referring to FIG. 5, for example, the electronic device 100 may obtain a plurality of gaze points including first through third gaze points 503, 504, and 505 indicating positions of the gaze when the user gazes at the particular calibration point 502.

In operation S402 of FIG. 4, the electronic device 100 may calculate a gaze accuracy corresponding to the at least one calibration point by using a distance between the at least one calibration point and the at least one gaze point corresponding to the at least one calibration point.

According to an exemplary embodiment of the disclosure, the electronic device 100 may calculate a gaze accuracy for each of the plurality of calibration points.

The electronic device 100 may calculate a separation distance di between one of the plurality of gaze points corresponding to the particular calibration point and the particular calibration point, and calculate the gaze accuracy based on a reciprocal number 1/di of the separation distance. The electronic device 100 may use reciprocal values of a plurality of separation distances corresponding to the particular calibration point to calculate an average of the reciprocal values as the gaze accuracy.

The electronic device 100 may calculate the gaze accuracy based on a specific equation using a median value, a dispersion, a standard deviation, etc., among the plurality of separation distances.

Referring to FIG. 5, the electronic device 100 may calculate the gaze accuracy at the calibration point 502 by using a distance d1 between the calibration point 502 and the first gaze point 503, a distance d2 between calibration point 502 and the second gaze point 504, and a distance d3 between the calibration point 502 and the third gaze point 505.

According to an exemplary embodiment of the disclosure, when a plurality of gaze points corresponding to a particular calibration point are distributed close to the particular calibration point, a gaze accuracy at the particular calibration point may be determined to be high. Generally, a user's gaze at a first calibration point indicated at a first position is accurate at the first calibration point as a sight at the first calibration point is high, such that the plurality of gaze points obtained based on the gaze information detected from the gaze tracking sensor may be distributed closely to the first calibration point.

Meanwhile, when a plurality of gaze points corresponding to the second calibration point indicated at a second position that is different from the first position are distributed and separated from the second calibration point by a specific distance or more, a gaze accuracy at the second calibration point may be calculated as being low.

Figure 6:
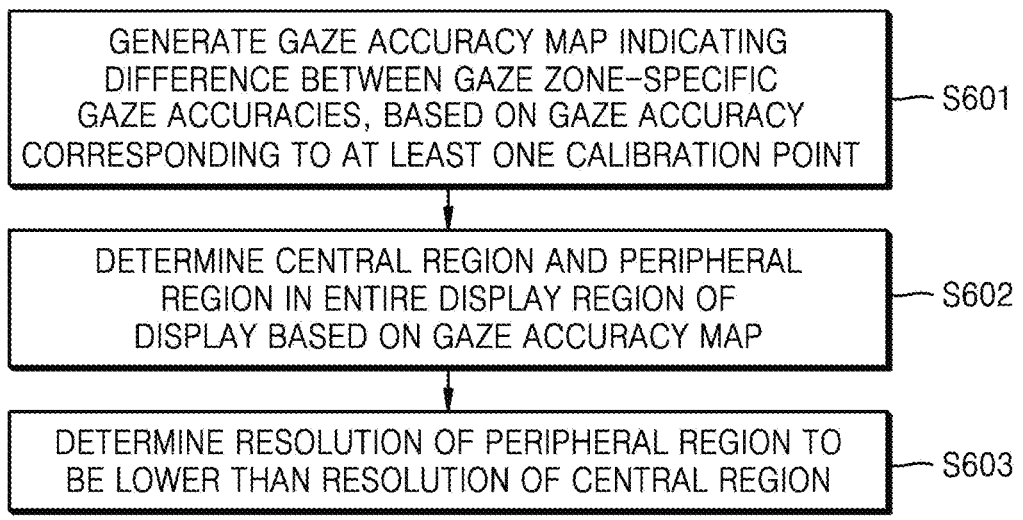
FIG. 6 is a flowchart of a method, performed by an electronic device, of generating a gaze accuracy map, according to an exemplary embodiment of the disclosure.
Figure 7:
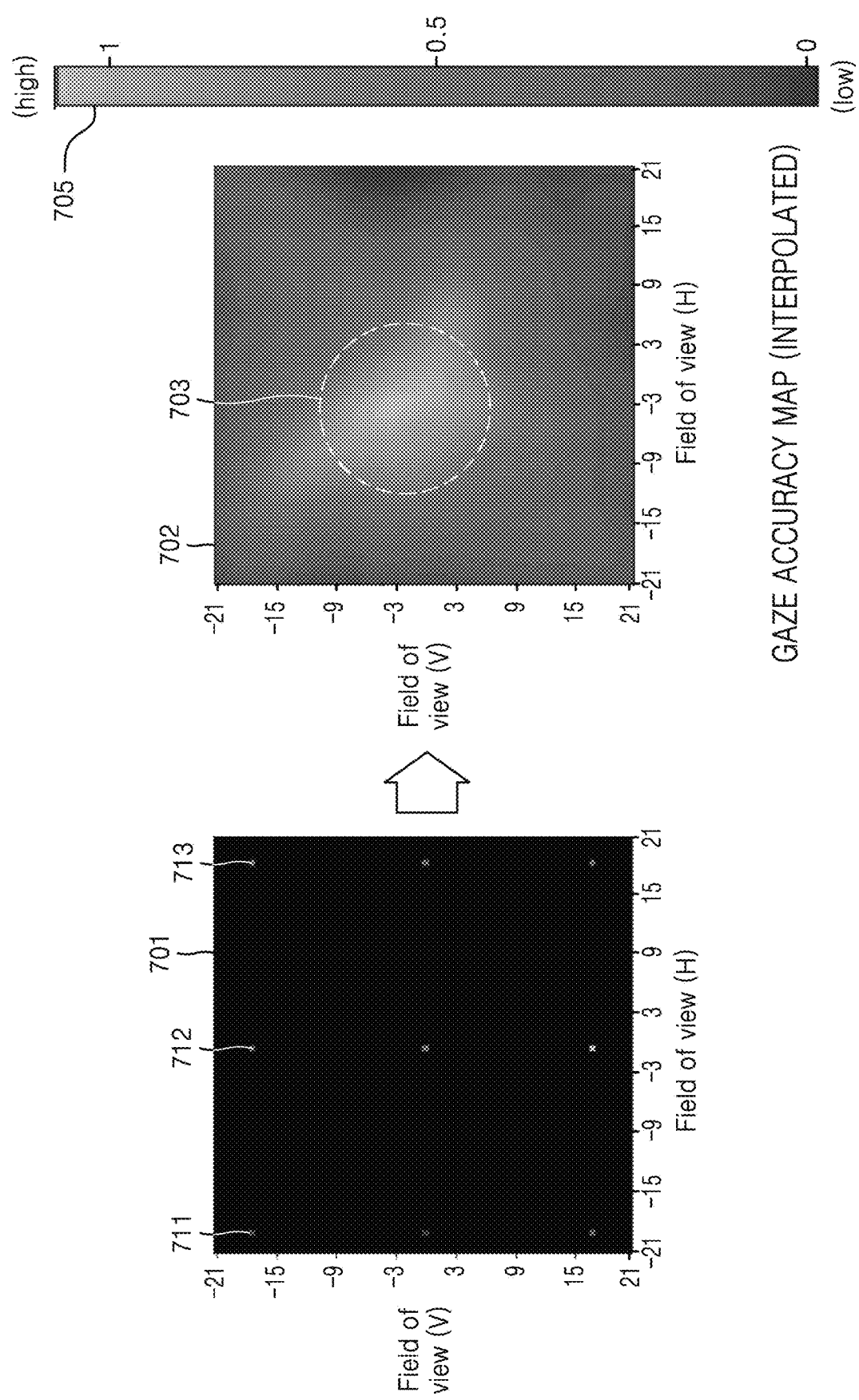
FIG. 7 is a flowchart of a method, performed by an electronic device, of generating a gaze accuracy map, according to an exemplary embodiment of the disclosure.
Figure 8:
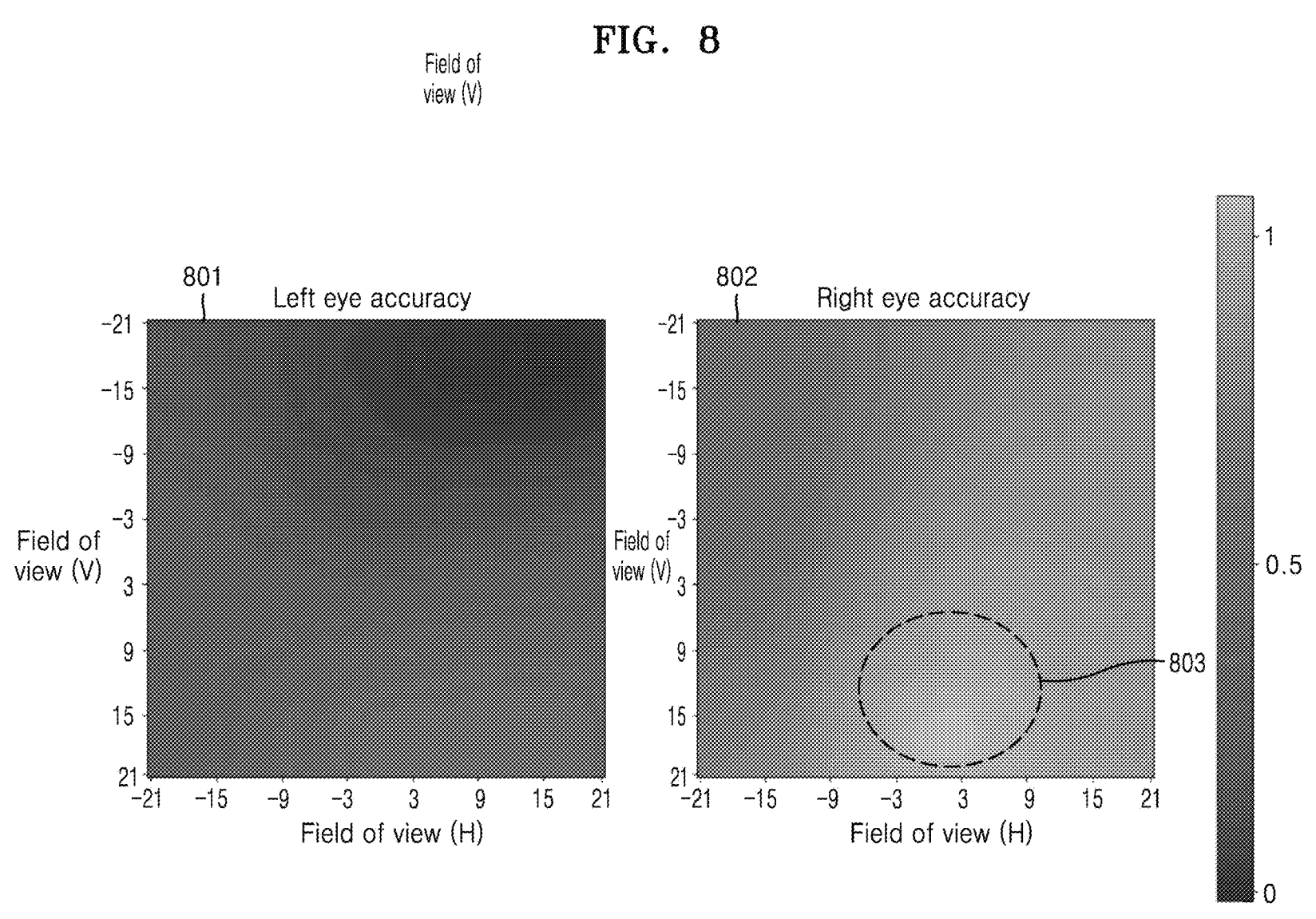

FIG. 6 is a flowchart of a method of a method, performed by an electronic device, of generating a gaze accuracy map, according to an exemplary embodiment of the disclosure. FIG. 7 is a flowchart of a method of a method, performed by an electronic device, of generating a gaze accuracy map, according to an exemplary embodiment of the disclosure. FIG. 8 is a view for describing an example of a gaze accuracy map according to an exemplary embodiment of the disclosure. FIGS. 7 and 8 are views referred to for describing the flowchart of FIG. 6.

In operation S601 of FIG. 6, the electronic device 100 may generate a gaze accuracy map indicating a relative difference between the gaze-zone gaze accuracies based on the gaze accuracy corresponding to the at least one calibration point.

According to an embodiment of the disclosure, to generate the gaze accuracy map for the entire display region, it is necessary to estimate gaze accuracies not only at the plurality of calibration points used in calibration but also in a peripheral region around the plurality of calibration points in the entire display region.

The electronic device 100 may perform interpolation that estimates a gaze accuracy in a region where a calibration point is not indicated, based on the positions of the plurality of calibration points used in calibration.

Referring to FIG. 7, based on a gaze accuracy corresponding to each of a plurality of calibration points including first through third calibration points 711, 712, and 713, the electronic device 100 may estimate a gaze accuracy for a region except for the plurality of calibration points in the entire display region 701.

A gaze accuracy at a particular position in the entire display region 701 may be estimated using a gaze accuracy at calibration points near the particular position. For example, an interpolation method may be used which estimates a gaze accuracy based on a certain equation which sets a high weight for a close calibration point to increase an influence of a gaze accuracy at a particular position thereupon and a low weight for a distant calibration point to reduce an influence thereupon, without being limited thereto. An appropriate interpolation method may be used according to the amount of data, the performance of a processor, etc.

According to an exemplary embodiment of the disclosure, a particular color indicating a particular gaze accuracy may be designated to express a gaze accuracy difference with a color difference in the gaze accuracy map.

Referring to FIG. 7, a bar graph 705 indicating a designated color according to a gaze accuracy is illustrated. As the gaze accuracy increases, a bright color (e.g., yellow) may be designated; as the gaze accuracy decreases, a dark color (e.g., purple) may be designated.

The electronic device 100 may generate a gaze accuracy map by converting the entire display region into a color corresponding to each gaze accuracy, based on gaze accuracies at a plurality of calibration points and a gaze accuracy estimated for a region excluding a calibration point.

As shown in FIG. 7, in a gaze accuracy map 702, gaze accuracies for the entire display region may be expressed as colors. In the gaze accuracy map, a region including bright colors (e.g., yellow) may have relatively high gaze accuracies, and a region including dark colors (e.g., purple) may have relatively low gaze accuracies.

In operation S602 of FIG. 6, the electronic device 100 may determine a central region and a peripheral region in the entire display region of the display based on the gaze accuracy map.

According to an exemplary embodiment of the disclosure, the electronic device 100 may determine a gaze zone having a high gaze accuracy as the central region and the other region than the central region of the entire display region of the display 140 as the peripheral region.

Referring to FIG. 7, the electronic device 100 may determine a region appearing to have a relatively high gaze accuracy, e.g., a region in which yellow is distributed, as a central region 703 and a region of the entire display region except for the central region 703 as a peripheral region.

In operation S603 of FIG. 6, the electronic device 100 may determine a resolution of the peripheral region to be lower than that of the central region.

According to an exemplary embodiment of the disclosure, the electronic device 100 may determine a gaze zone-specific resolution based on the gaze accuracy map.

Referring to the gaze accuracy map 702 of FIG. 7, a resolution of the peripheral region, except for the region in which yellow is distributed which is determined as the central region 703, may be determined to be lower than that of the central region 703.

Thus, the electronic device 100 may perform rendering to a lower resolution on a display region corresponding to the peripheral region except for the central region, when the electronic device 100 displays the image on the display 140 of FIG. 2.

The electronic device 100 may generate a gaze accuracy map for each of the eyes of the user and determine a gaze zone-specific resolution for each of the eyes.

The electronic device 100 may obtain left-eye gaze information and right-eye gaze information of the user through the gaze tracking sensor 157 of FIG. 2 in the process of performing calibration. The electronic device 100 may obtain a gaze accuracy of the left eye based on the left-eye gaze information and a gaze accuracy of the right eye based on the right-eye gaze information. The electronic device 100 may generate a gaze accuracy map of the left eye based on the gaze accuracy of the left eye and a gaze accuracy map of the right eye based on the gaze accuracy of the right eye.

Referring to FIG. 8, a left-eye gaze accuracy map 801 and a right-eye gaze accuracy map 802 may be generated, respectively. It may be seen that globally dark colors (e.g., purple) are distributed in the left-eye gaze accuracy map 801 and globally bright colors (e.g., yellow, green) are distributed in the right-eye gaze accuracy map 802.

The electronic device 100 may determine a region appearing to have a relatively high gaze accuracy, e.g., a region in which yellow is distributed, as a central region 803 and a region of the entire display region except for the central region 803 as a peripheral region, in the right-eye gaze accuracy map 802. The electronic device 100 may determine the resolution of the peripheral region except for the central region 803 in the entire display region to be lower than that of the central region 803. According to an exemplary embodiment of the disclosure, the electronic device 100 may determine a gaze zone-specific resolution of the left eye to be globally lower than a gaze zone-specific resolution of the right eye.

Thus, when the electronic device 100 displays the image on the display 140 of FIG. 2, the electronic device 100 may perform rendering to a high resolution on a region of an image, which corresponds to the central region 803 in an image the user is to see with the right eye, and perform rendering to a lower resolution than the central region 803 on a region of the image, which corresponds to the peripheral region except for the central region.

Figure 9:
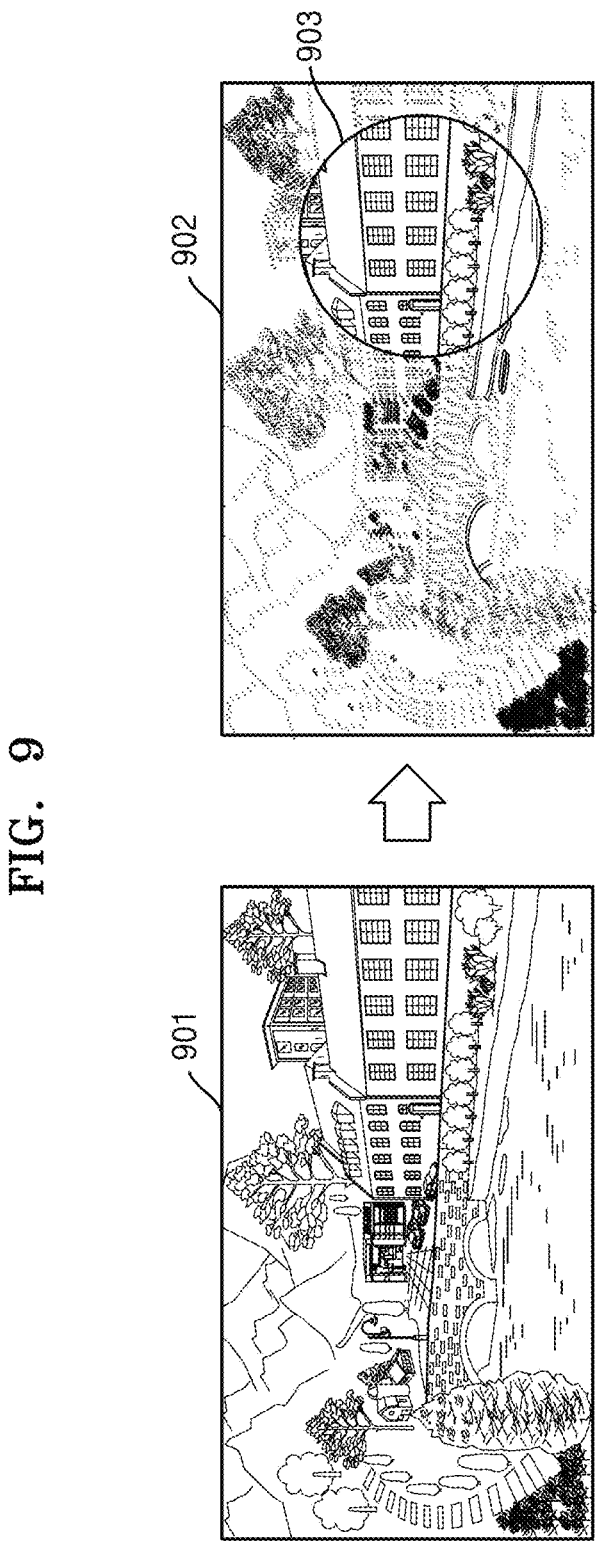
FIG. 9 is a view for describing an example where an electronic device displays an image, according to an exemplary embodiment of the disclosure.

FIG. 9 is a view for describing an example where an electronic device displays an image, according to an embodiment of the disclosure.

In FIG. 9, a first image 901 shows an example of performing image rendering to the same resolution for the entire display region. Like in the first image 901, when the electronic device 100 performs image rendering to the same high resolution to provide a clear image to the user, a lot of computation and data are required and power consumption may be increased.

Meanwhile, according to an exemplary embodiment of the disclosure, as shown in a second image 902, the electronic device 100 may perform image rendering to a high resolution for a region determined to be a central region 903 in the entire display region and image rendering to a low resolution for a peripheral region except for the central region 903 in the entire display region, thereby providing a cognitively high-resolution image to the user at high speed while reducing the amount of computations, the amount of data, and the amount of power consumption for rendering.

Figure 10:
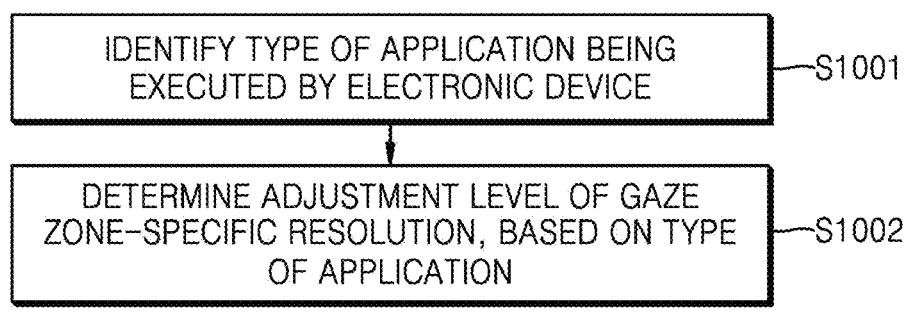
FIG. 10 is a flowchart of a method, performed by an electronic device, of determining a resolution based on an application type, according to an exemplary embodiment of the disclosure.

FIG. 10 is a flowchart of a method of a method, performed by an electronic device, of determining a resolution based on an application type, according to an exemplary embodiment of the disclosure.

In operation S1001 of FIG. 10, the electronic device 100 may identify a type of an application being executed.

According to an exemplary embodiment of the disclosure, when the electronic device 100 executes an application, image rendering may be requested through the display 140 of FIG. 2. The electronic device 100 may determine whether the application requires a high-resolution image or requires high-speed by providing a low-resolution image, according to a type of the application.

In operation S1002 of FIG. 10, the electronic device 100 may determine an adjustment level of a gaze zone-specific resolution based on the type of the application.

According to an embodiment of the disclosure, the adjustment level of the gaze zone-specific resolution may mean a high or low level of the gaze zone-specific resolution required according to the image to be displayed on the display 140.

According to an exemplary embodiment of the disclosure, the electronic device 100 may set a low adjustment level for the entire display region of the display 140 when the electronic device 100 determines according to the type of the application that the application requires high-speed by providing low-resolution images. Thus, the electronic device 100 may output a low-resolution image for the central region and a lower-resolution image for the peripheral region than the resolution of the image for the central region in the entire display region.

For example, when the type of the application is identified as the navigation application, this situation requires rapid providing of the low-resolution images, and the electronic device 100 may determine a low adjustment level of a resolution.

For example, when the type of the application is identified as the game application, this situation requires providing the high-resolution image, and the electronic device 100 may determine a high adjustment level of a resolution. Thus, the electronic device 100 may output the high-resolution image for the central region and a lower-resolution image for the peripheral region than the resolution of the image for the central region.

Figure 11:
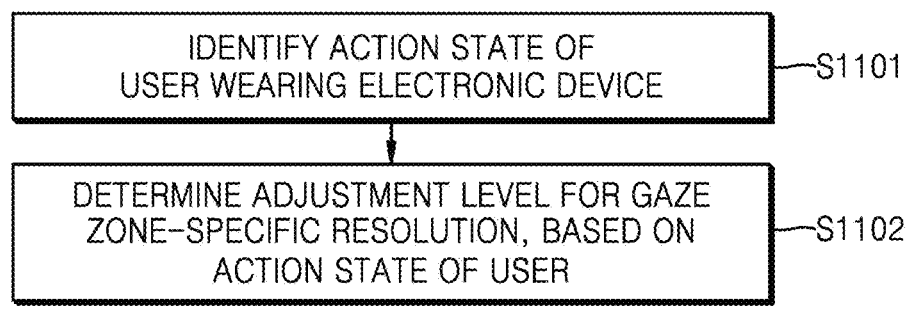
FIG. 11 is a flowchart of a method, performed by an electronic device, of determining a resolution based on an action state of a user, according to an exemplary embodiment of the disclosure.

FIG. 11 is a flowchart of a method of a method, performed by an electronic device, of determining a resolution based on an action state of a user, according to an exemplary embodiment of the disclosure.

In operation S1101 of FIG. 11, the electronic device 100 may identify the action state of the user wearing the electronic device 100. According to an exemplary embodiment of the disclosure, the action state of the user may be, but is not limited to, a stationary state, a walking state, or a vehicle driving state.

For example, the electronic device 100 may identify the walking state of the user through the motion sensor 155 of FIG. 2 (e.g., an acceleration sensor, a gyroscope sensor, or a geomagnetic sensor). Additionally, the electronic device 100 may identify the vehicle driving state of the user through the GPS sensor thereof.

According to an exemplary embodiment of the disclosure, the electronic device 100 may determine based on the identified action state of the user wearing the electronic device 100 whether providing of a high-resolution image is required or providing high-speed low-resolution images is required.

In operation S1102 of FIG. 11, the electronic device 100 may determine an adjustment level of a gaze zone-specific resolution based on the action state of the user.

According to an exemplary embodiment of the disclosure, the electronic device 100 may set a low adjustment level for the entire display region of the display 140 when the electronic device 100 determines according to the action state of the user that the application requires providing high-speed low-resolution images. Thus, the electronic device 100 may output a low-resolution image for the central region and a lower-resolution image for the peripheral region than the resolution of the image for the central region in the entire display region.

For example, when the action state of the user is identified as the vehicle driving state, this situation requires rapidly providing low-resolution images, and the electronic device 100 may determine a low adjustment level of the resolution. For example, when the action state of the user is identified as the stationary state, this situation requires providing the high-resolution image, and the electronic device 100 may determine a high adjustment level of the resolution. Thus, the electronic device 100 may output the high-resolution image for the central region and a lower-resolution image for the peripheral region than the resolution of the image for the central region.

Figure 12:
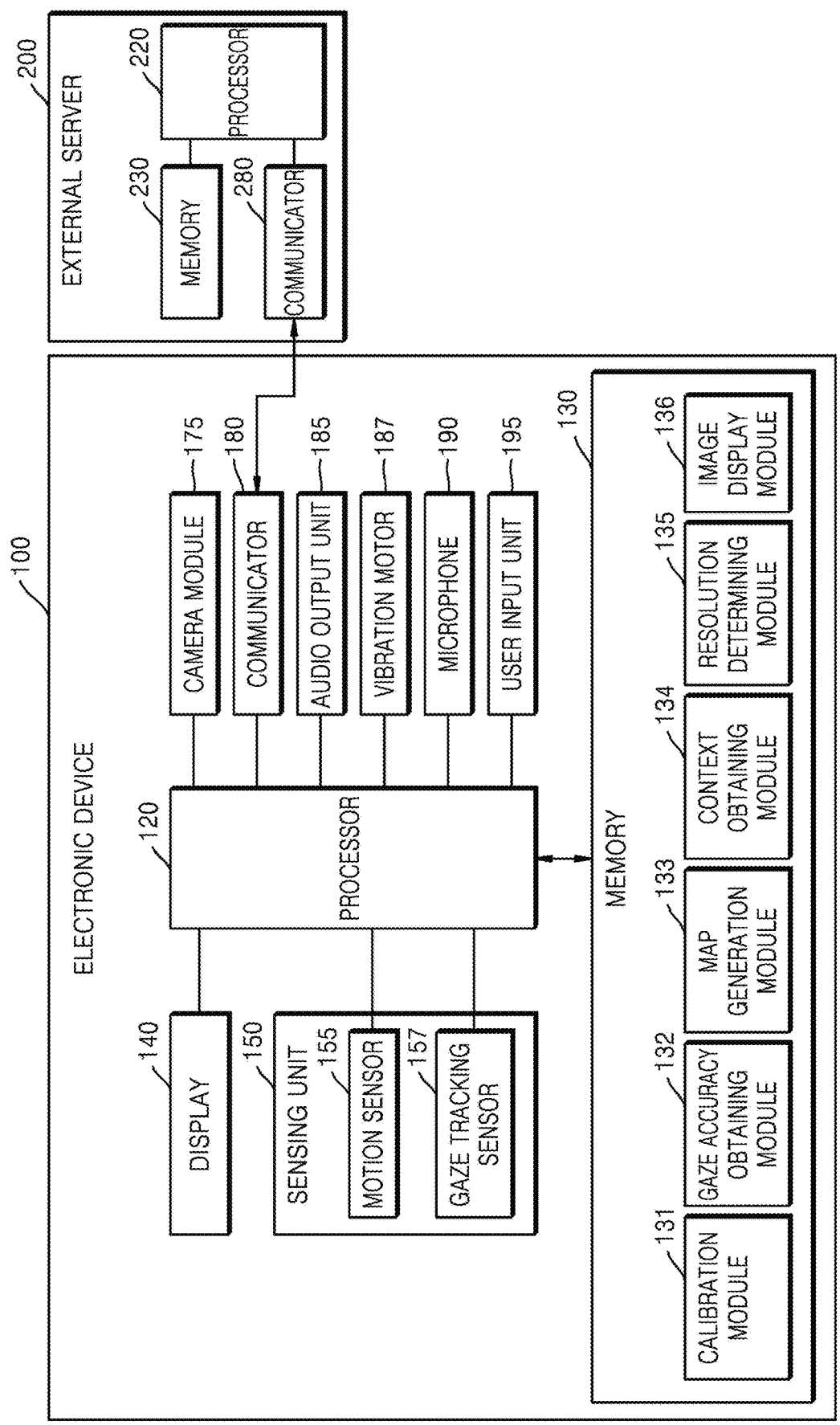
FIG. 12 is a block diagram of an electronic device and an external server according to an exemplary embodiment of the disclosure.

FIG. 12 is a block diagram of an electronic device and an external server according to an exemplary embodiment of the disclosure.

A component of the electronic device 100 shown in FIG. 12 may correspond to a component of the electronic device 100 shown in FIG. 3, and thus a description thereof will be omitted.

According to an exemplary embodiment of the disclosure, the electronic device 100 transmits data to and receives data from the external server 200 through the communicator 180.

The external server 200 shown in FIG. 12 may include a processor 220, a memory 230, and a communicator 280. However, components shown in FIG. 12 may not be essential components of the external server 200. More components or less components than those shown in FIG. 12 may be used to implement the external server 200.

The processor 220 according to an exemplary embodiment of the disclosure may control the external server 200 overall. The processor 220 may include one processor or a plurality of processors. The processor 220 according to an exemplary embodiment of the disclosure may execute one or more programs stored in the memory 230.

The memory 230 according to an exemplary embodiment of the disclosure may store various data, programs, or applications for driving and controlling the external server 200. The programs stored in the memory 230 may include one or more instructions. The programs (for example, one or more instructions) or applications stored in the memory 230 may be executed by the processor 220.

The memory 230 according to an exemplary embodiment of the disclosure may store a program for processing and controlling the processor 220. The programs stored in the memory 230 may be classified into a plurality of modules according to functions thereof.

The communicator 280 may include one or more components that enable communication between the electronic device 100 and the external server 200 or an external device (not shown).

For example, the communicator 280 may include a short-range communicator and a mobile communicator.

The short-range communicator may include, but is not limited to, a Bluetooth communication unit, a short-range wireless communication unit (an NFC unit/RFID unit), a WLAN (WiFi) communication unit, a ZigBee communication unit, an IrDA communication unit, an UWB communication unit, an Ant+ communication unit, etc.

The mobile communicator may transmit and receive a radio signal to and from at least one of a base station, an external terminal, or a server over a mobile communication network. Herein, the radio signal may include various forms of data corresponding to transmission/reception of a voice call signal, a video communication call signal, or a text/multimedia message.

According to an exemplary embodiment of the disclosure, the external server 200 may perform at least some of operations described as the operations of the electronic device 100 in FIG. 2.

According to an exemplary embodiment of the disclosure, the external server 200 may receive data including gaze information obtained in calibration from the electronic device 100 through the communicator 280. The external server 200 may calculate a gaze accuracy based on the received gaze information. The external server 200 may generate a gaze accuracy map based on the gaze accuracy and determine the gaze zone-specific resolution based on the gaze accuracy map. The external server 200 may transmit the determined gaze zone-specific resolution to the electronic device 100 through the communicator 280. The electronic device 100 may display an image through the display 140 of FIG. 2 based on the gaze zone-specific resolution determined by the external server 200.

The external server 200 may transmit the image rendered based on the determined gaze zone-specific resolution to the electronic device 100. By transmitting image data rendered to a lower resolution for the peripheral region than a resolution for the central region, the amount of communication may be reduced according to reduction of the amount of data and thus image transmission may be rapidly performed.

Meanwhile, the foregoing embodiment of the disclosure may be written as a program executable on computers, and may be implemented on a general-purpose digital computer operating the program by using a computer-readable medium. In addition, a structure of data used in the foregoing embodiment of the disclosure may be recorded on a computer-readable medium using various means. Moreover, the foregoing embodiment of the disclosure may be implemented in the form of a recording medium including a computer-executable instruction such as a programming module executed by a computer. For example, methods implemented with a software module or algorithm may be stored in a computer-readable recording medium as codes or program commands that are readable and executable by computers.

The computer-readable medium may be an arbitrary recording medium that is accessible by a computer, and may include all of a volatile medium, a non-volatile medium, a separated medium, and a non-separated medium. The computer-readable medium may include, but is not limited to, a storage medium, for example, a magnetic storage medium such as a read-only memory (ROM), a floppy disk, a hard disk, etc., an optical reading medium such as a compact-disc (CD)-ROM, a digital versatile disc (DVD), etc. The computer-readable medium may also include both a computer storage medium and a communication medium.

Moreover, a plurality of computer-readable recording media may be distributed over network-connected computer systems, and data, for example, program instructions and codes, stored in the distributed recording media, may be executed by at least one computer.

The particular implementations described in the disclosure are illustrative examples and are not intended to otherwise limit the scope of the disclosure in any way. For the sake of brevity of the specification, electronic configurations, control systems, software development and other functional aspects of the systems according to the related art may not be provided.

Those of ordinary skill in the art to which the disclosure pertains will appreciate that the disclosure may be implemented in different detailed ways without departing from the technical spirit or essential characteristics of the disclosure. Thus, it should be noted that the above-described embodiments of the disclosure are provided as examples and should not be interpreted as limiting. For example, each element described as a single type may be implemented in a distributed manner, and likewise, elements described as being distributed may be implemented as a coupled type.

The use of all examples or exemplary terms is merely intended to describe the disclosure in detail, and the scope is not necessarily limited by the examples or exemplary terms unless defined by the claims.

Moreover, no item or component is essential to execution of the disclosure unless the component is specifically described as "essential" or "critical".

It would be understood by those of ordinary skill in the art that the disclosure may be implemented in a modified form without departing from the essential characteristics of the disclosure.

The disclosure may have various modifications and several embodiments thereof, and thus the disclosure is not limited by the specific embodiments thereof described in the specification, and it should be understood that all modifications, equivalents, or substitutions within the spirit and scope of the disclosure are included in the disclosure. Therefore, the disclosed embodiments of the disclosure should be understood in an illustrative sense rather than a restrictive sense.

The scope of the disclosure is defined by the following claims rather than the detailed description, and the meanings and scope of the claims and all changes or modified forms derived from their equivalents should be construed as falling within the scope of the disclosure.

The term used in the embodiments of the disclosure such as "unit" or "module" indicates a unit for processing at least one function or operation, and may be implemented in hardware, software, or in a combination of hardware and software.

The term "unit" or "module" may be implemented by a program that is stored in an addressable storage medium and executable by a processor.

For example, the term "unit" or "module" may include software components, object-oriented software components, class components and task components, processes, functions, attributes, procedures, subroutines, segments of a program code, drivers, firmware, microcode, circuitry, data, databases, data structures, tables, arrays, and variables.

Herein, the mentioning "A may include one of a1, a2, and a3" may have a large meaning that an exemplary element included in an element A is a1, a2, or a3.

Due to the mentioning, an element constituting the element A may not be necessarily limited to a1, a2, or a3. Thus, it should be noted that the element constituting the element A may not be exclusively interpreted as meaning that other elements that are not listed, except for a1, a2, and a3, are excluded.

In addition, the mentioning may mean that A includes a1, includes a2, or includes a3. The mentioning may not mean that the elements constituting A are selectively determined necessarily in a certain set. For example, it should be noted that the mentioning is not limitedly interpreted as a1, a2, or a3, selected from a set including a1, a2, and a3, necessarily constituting the component A.

What is claimed is:

1. An electronic device comprising:
   a display;
   a sensor configured to obtain gaze information of an eye of a user;
   a memory storing one or more instructions; and
   a processor configured to execute the one or more instructions stored in the memory to:
     output at least one calibration point through the display;
     obtain the gaze information corresponding to the at least one calibration point by using the sensor based on an output of guide information instructing the user wearing the electronic device to gaze at the at least one calibration point;
     obtain a gaze accuracy corresponding to the at least one calibration point, based on the obtained gaze information;
     determine a gaze zone-specific resolution based on the gaze accuracy corresponding to the at least one calibration point; and
     output an image through the display, based on the determined gaze zone-specific resolution.

2. The electronic device of claim 1, wherein the processor is further configured to execute the one or more instructions to:
   determine at least one gaze point corresponding to the at least one calibration point, based on the obtained gaze information; and
   calculate the gaze accuracy corresponding to the at least one calibration point by using a distance between the at least one calibration point and the at least one gaze point corresponding to the at least one calibration point.

3. The electronic device of claim 1, wherein the processor is further configured to execute the one or more instructions to:
   generate a gaze accuracy map indicating a difference between gaze zone-specific gaze accuracies based on the gaze accuracy corresponding to the at least one calibration point; and
   determine the gaze zone-specific resolution, based on the gaze accuracy map.

4. The electronic device of claim 3, wherein the processor is further configured to execute the one or more instructions to:
   determine a central region and a peripheral region in an entire display region of the display based on the gaze accuracy map; and
   determine a resolution of the peripheral region to be lower than a resolution of the central region.

5. The electronic device of claim 1, wherein the gaze information comprises left-eye gaze information and right-eye gaze information, and
   the processor is further configured to execute the one or more instructions to:
     obtain a gaze accuracy of a left eye based on the left-eye gaze information and a gaze accuracy of a right eye based on the right-eye gaze information; and
     determine a gaze zone-specific resolution of the left eye based on the gaze accuracy of the left eye and determine a gaze zone-specific resolution of the right eye based on the gaze accuracy of the right eye.

6. The electronic device of claim 1, wherein the processor is further configured to execute the one or more instructions to:

identify a type of an application being executed by the electronic device; and determine an adjustment level for the gaze zone-specific resolution based on the type of the application.

7. The electronic device of claim 1, wherein the processor is further configured to execute the one or more instructions to:

identify an action state of the user wearing the electronic device; and determine an adjustment level for the gaze zone-specific resolution based on the action state of the user.

8. The electronic device of claim 7, wherein the action state of the user comprises at least one of a stationary state, a walking state, a running state, or a vehicle driving state.

9. An operating method of an electronic device, the operating method comprising:

outputting at least one calibration point through a display;

obtaining gaze information corresponding to the at least one calibration point by using a sensor in response to an output of a guide information instructing a user wearing the electronic device to gaze at the at least one calibration point;

obtaining a gaze accuracy corresponding to the at least one calibration point based on the obtained gaze information;

determining a gaze zone-specific resolution based on the gaze accuracy corresponding to the at least one calibration point; and outputting an image through the display based on the determined gaze zone-specific resolution.

10. The operating method of claim 9, wherein the obtaining of the gaze accuracy comprises:

determining at least one gaze point corresponding to the at least one calibration point based on the obtained gaze information; and calculating the gaze accuracy corresponding to the at least one calibration point by using a distance between the at least one calibration point and the at least one gaze point corresponding to the at least one calibration point.

11. The operating method of claim 9, wherein the determining of the gaze zone-specific resolution comprises:

generating a gaze accuracy map indicating a difference between gaze zone-specific gaze accuracies based on the gaze accuracy corresponding to the at least one calibration point; and determining the gaze zone-specific resolution, based on the gaze accuracy map.

12. The operating method of claim 11, wherein the determining of the gaze zone-specific resolution comprises:

determining a central region and a peripheral region in an entire display region of the display based on the gaze accuracy map; and determining a resolution of the peripheral region to be lower than a resolution of the central region.

13. The operating method of claim 9, wherein the gaze information comprises left-eye gaze information and right-eye gaze information;

the obtaining of the gaze accuracy comprises obtaining a gaze accuracy of a left eye based on the left-eye gaze information and obtaining a gaze accuracy of a right eye based on the right-eye gaze information; and the determining of the gaze zone-specific resolution comprises determining a gaze zone-specific resolution of the left eye based on the gaze accuracy of the left eye and determining a gaze zone-specific resolution of the right eye based on the gaze accuracy of the right eye.

14. The operating method of claim 9, wherein the determining of the gaze zone-specific resolution comprises:

identifying a type of an application being executed by the electronic device; and determining an adjustment level for the gaze zone-specific resolution based on the type of the application.

15. The operating method of claim 9, wherein the determining of the gaze zone-specific resolution comprises:

identifying an action state of the user wearing the electronic device; and determining an adjustment level for the gaze zone-specific resolution based on the action state of the user.

16. The operating method of claim 15, wherein the action state of the user comprises at least one of a stationary state, a walking state, a running state, or a vehicle driving state.

17. A non-transitory computer-readable recording medium having recorded thereon a program for executing the operating method of claim 9 on a computer.

18. An operating method of an electronic device, the operating method comprising:

displaying at least one calibration point for a user wearing the electronic device, to look at the at least one calibration point;

obtaining line of sight line information of the user wearing the electronic device, the line of sight information comprising a plurality of line of sight points collected while the user looks at the at least one calibration point;

transmitting the line of sight information to an external server;

receiving a line of sight zone-specific resolution from the external server determined using a line of sight accuracy calculated by the external server based on a difference between the at least one calibration point and the plurality of line of sight points; and displaying an image based on the received line of sight zone-specific resolution.

19. The operating method of claim 18, wherein, the image comprises a central portion and a peripheral portion, the peripheral portion being a part of the image not including the central portion;

the central portion has a first line of sight accuracy, and the peripheral portion has a second line of sight accuracy that is lower than the first line of sight accuracy;

the central portion of the image is displayed at a first resolution;

the peripheral portion of the image is displayed at a second resolution; and the first resolution is higher than the second resolution.

* * * * *